Aug. 27, 1963
A. T. HUNTER
3,101,697
STEAM GENERATION
Filed May 7, 1956
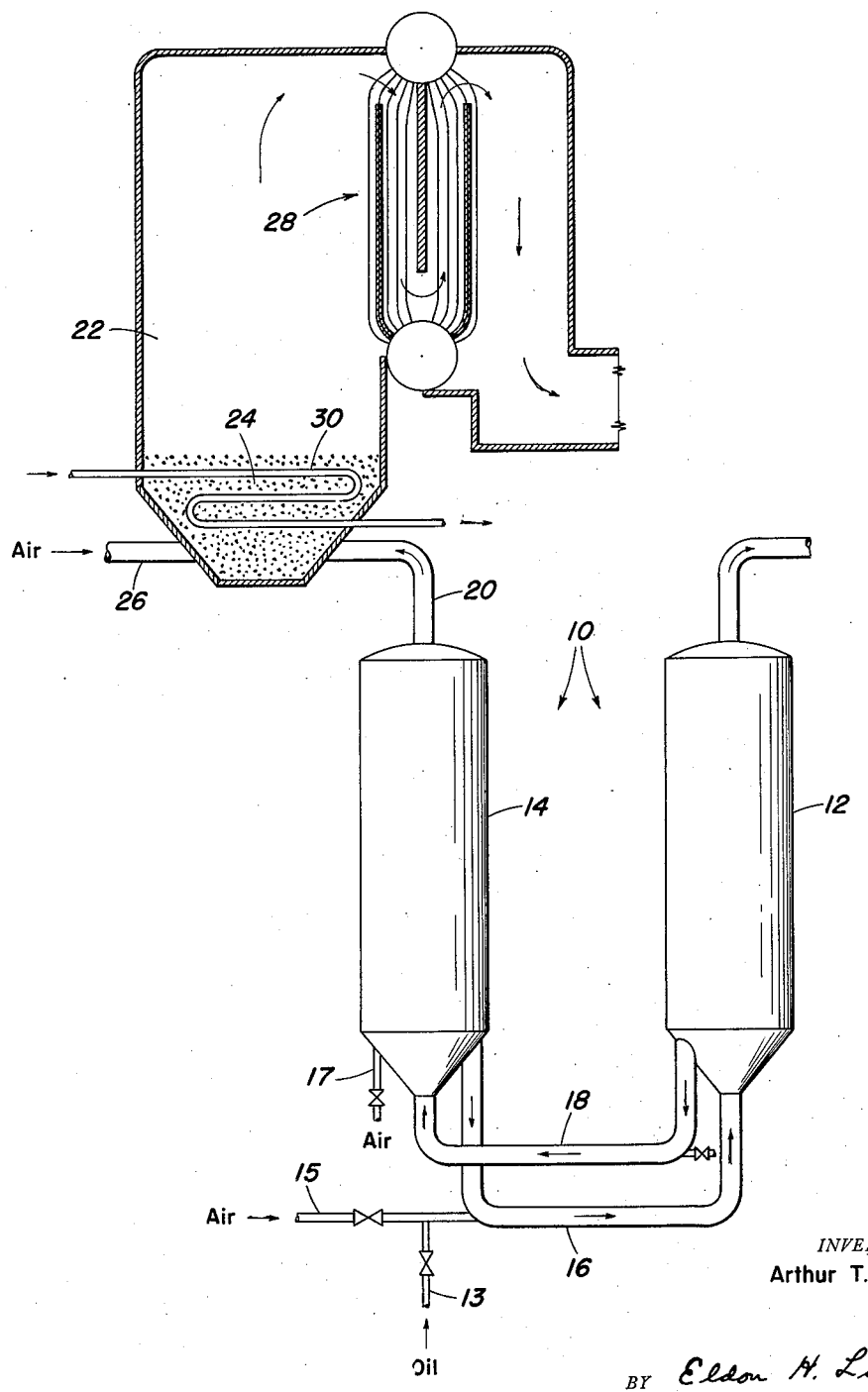
INVENTOR.
Arthur T. Hunter
BY *Eldon H. Luther*
ATTORNEY

3,101,697
STEAM GENERATION
Arthur T. Hunter, New York, N.Y., assignor to Combustion Engineering, Inc., New York, N.Y., a corporation of Delaware
Filed May 7, 1956, Ser. No. 583,192
6 Claims. (Cl. 122—4)

This invention relates to a method of oxidizing a fuel-air mixture and generating steam and has particular relation to a method of oxidizing such a mixture which is outside the range of inflammability and which is contained in a gasiform stream within which is entrained particulate foreign material.

There are many industrial processes which result in the production of a gaseous effluent that contains such a low percentage of combustible constituents that it is impossible without the addition of fuel to the gasiform stream to produce a combustible mixture of these constituents and a combustion supporting gas such as air. While these combustible constituents may be oxidized by passing them over an oxidation catalyst which will oxidize a fuel-air mixture which is outside the range of inflammability this is complicated in many instances by having foreign particulate matter entrained in the gases produced by the particular industrial process. In order to oxidize a fuel-air mixture that is outside the range of inflammability by passing it over an oxidation catalyst it is of course imperative that there be provided intimate contact between the fuel-air mixture and the catalyst since the catalytic oxidation of the mixture takes place upon the surface of the catalyst. When the gasiform stream containing the fuel-air mixture also has entrained in it particulate foreign matter it is difficult to provide an organization over which the gasiform stream may pass and which will provide intimate contact between the catalyst and the fuel-air mixture in the gasiform stream and which at the same time will not become plugged as a result of the foreign particulate material that is entrained in the gasiform stream. When spaced rods, bars, or tubes, or the like, are employed to support the catalyst and to form a grid over which the gasiform stream is to pass rather poor contact between the fuel-air mixture and the catalyst is had even with a very large number of such structural elements disposed throughout a substantial distance in the direction of gas flow because of the large space that is required between adjacent members in order to positively prevent plugging of the grid. The present invention is directed to an improved method of oxidizing constituents contained in such a gasiform stream and in utilizing the heat thus developed with this improved method overcoming this difficulty.

In accordance with the invention the gasiform stream which contains a mixture of fuel and oxygen that is outside the range of inflammability and also contains foreign particulate material, as, for example, the effluent gases from the regenerator of a catalytic cracker, are introduced and passed through a bed of discrete particulate material that is at least in part an active oxidation catalyst of such activity that the bed as a whole is capable of catalytically oxidizing the fuel-air mixture in the gasiform stream. The size of the particles of this material that make up this bed are substantially larger than the particulate material entrained in the gasiform stream and the gases are passed upwardly through the bed of material at a sufficient velocity to maintain the same in a fluidized state and to maintain the foreign particulate material entrained therein so that this foreign material passes through the fluidized bed and upwardly with the gases leaving the bed. In passing through the fluidized bed of catalyst the combustible constituents within the gasiform stream are oxidized thereby liberating heat and the effluent from the bed of catalyst is passed over heat exchange surface, such as a boiler, where a portion of the heat contained in these gases is given up. The temperature of the gases leaving the process is desirably above the activation temperature of the catalyst so that these gases will heat the catalyst to its activation temperature with such being the case with the gases leaving the regenerator of a catalytic cracker. If the temperature of these gases is not sufficiently high to accomplish this result additional heat will have to be imparted to the bed of catalyst initially to raise its temperature to the activation temperature of the catalyst after which oxidation within the bed itself will maintain the bed temperature above this required minimum.

A bed of discrete material may be fluidized by passing a stream of gas upwardly therethrough, with fluidization for a particular particle size occurring at or above a predetermined velocity. When in this fluidized state the particles of the material move rather rapidly throughout the body of the material with the entire mass being in an agitated state resembling a boiling liquid and with the violence of the agitation depending upon the velocity of the gas passing upwardly through the material. When in this fluidized state the material is not carried along with the fluidizing gas and although the body of material will be expanded from its packed or nonfluidized condition, the fluidizing gas passes through the material and leaves the same at what is termed a "disengaging zone." With a given particle size the velocity of the gases passing through the material must be maintained within specific minimum and maximum limits in order to have proper fluidization. The maximum limit is that where substantial quantities of the material are carried away by the upflowing gas stream, or, in other words, the material becomes entrained within the gas stream, while the minimum limit is that below which fluidization does not occur with the mass of material remaining in the so-called packed condition and the particles not moving from their "at rest" position.

These fluidized beds of material have the inherent property of providing excellent contact between the upwardly flowing fluidizing gas stream and the particles in the bed because of the action of the particles in breaking down the gaseous film that surrounds an object placed in a gas stream.

The oxidation catalysts to which reference is being made, have definite upper and lower temperature limits in between which the catalyst will properly perform its intended function of catalyzing the oxidation of the fuel with the upper limit being termed the "deactivation" temperature above which the catalyst is inoperative and is permanently destroyed or permanently impaired and the lower limit being termed the "activation" temperature below which the catalyst will not function as a catalyst to catalyze the oxidation process. The catalysts that are herein contemplated function to catalytically oxidize the fuel without the development of a flame and owe their activity to physical structure and/or chemical constituents which require that they be used under such conditions that these special characteristics will not be destroyed. Examples of oxidation catalyst which are particularly suitable for use in the invention include activated forms of metal oxides impregnated with a minor amount of metal in finely divided forms.

In particular, activated forms of alumina, beryllia, thoria, zirconia, or magnesia, or mixtures of these oxides, impregnated with minor amounts of finely divided metals such as platinum, palladium, rhodium, ruthenium, silver, copper, chromium, manganese, nickel, cobalt or combinations of these metals such as silver-chromium, copper-chromium, copper-manganese combination, have been found to be especially suitable. Activated forms of these metal oxides may be prepared by controlled dehydration of a hydrated form of the oxide of the metal with the activated form of metal oxide thus produced having an extremely high porosity which results in a very large area being impregnated with the finely divided metal.

The activity of the catalyst of course varies in accordance with which the characteristic of the metal with which the activated metal oxide is impregnated with certain metals, such as platinum, having an extremely high activity. The amount of metal impregnation that is required also varies with the characteristic of the metal with a greater amount of impregnation being required with metals of decreasing activity in order to produce a catalyst which is of acceptable activity.

It is an object of this invention to provide an improved method of oxidizing a fuel-air mixture contained in a gasiform stream which has entrained therein foreign particulate material and which is outside the range of inflammability and in utilizing the heat developed by such oxidation.

Other and further objects of this invention will be apparent to those skilled in the art as the following detailed description proceeds wherein reference will be had to the accompanying drawing which is a diagrammatic representation of an apparatus for carrying out the improved method of the invention.

Referring now to the drawing, wherein like reference characters are used throughout to designate like elements, the structural organization depicted therein includes a conventional catalytic cracker for hydrocarbons represented diagrammatically as 10 and which includes cracker 12 and regenerator 14. Oil and air are introduced into conduit 16 from conduits 13 and 15 and transported together with regenerated catalyst through an air lift transport system to the cracker 12 where the oil is cracked. During the cracking process the catalyst becomes coated with carbon and is continuously returned to regenerator 14 through conduit 18. In the regenerator the carbon in burned off of the catalyst and the regenerated catalyst is returned to the cracker through conduit 16. The catalyst is in discrete form and is maintained in a fluidized state in both the cracker and the regenerator. In burning the carbon from the catalyst insufficient air for complete combustion is supplied to the regenerator through conduit 17 so that the gaseous effluent which passes upwardly from regenerator 14 through conduit 20 contains burnable constituents principally in the form of carbon monoxide with this gaseous effluent being from 3 to 7% CO and 5 to 10% oxygen, which is of course a mixture that is well outside the range of inflammability. Also contained in this effluent are particles of catalyst and other foreign matter with the maximum particle size being from 1/8 to 3/16 of an inch with this generally being the particle size of the catalyst employed in the cracking process and with some of this catalyst at times being entrained within the gaseous effluent of the regenerator while other particulate matter of smaller size is always entrained in this effluent.

This gaseous effluent from regenerator 14 is conveyed to the bottom of chamber 22 by conduit 20 and within this chamber there is disposed a particulate material which is comprised at least in part of an oxidation catalyst capable of oxidizing the combustibles in the gasiform stream introduced thereinto from conduit 20. If it is necessary that additional air be supplied to the material 24 this may be provided through conduit 26 which is directed or leads into the lower portion of the body of this material. The gaseous effluent from regenerator 14 is conveyed through the body of material with sufficient velocity to fluidize this material and in the organization disclosed the temperature of these gases will be between 700–800° F. which is sufficient to heat the catalyst material to its activation temperature. If the process which produces the gaseous effluent that passes through the catalytic material 24 is not sufficiently high to accomplish this result the material may be heated by introducing hot air thereinto through conduit 26.

In passing upwardly through the body of material 24 the combustible constituents within the gasiform stream introduced thereinto will be oxidized thereby liberating heat and the hot gases leaving this material are conveyed over the heat exchange surface of boiler 28 or some other suitable heat exchange apparatus and are then discharged to a stack or the like. A portion of the heat liberated within the bed by this oxidation of the combustible constituents may be absorbed within the bed itself and for this purpose heat exchange coil 30 is positioned within the bed and through which a fluid to be heated is conveyed. However, the temperature of the bed of material 24 must be maintained above its activation temperature so that the amount of heat that coil 30 may absorb from the bed is limited by this requirement.

This particulate material of which bed 24 is composed is of a size that is substantially larger than the largest particle of material that it is anticipated will be entrained in the gasiform stream introduced thereinto from conduit 20 and the velocity through this body of material 24 is maintained sufficiently high to keep the foreign material introduced thereinto with the gasiform stream entrained within this stream of gases so that this foreign material passes through this fluidized bed and is conveyed upwardly in chamber 22 with the upwardly rising gas stream and is discharged with these gases.

The range of particle size or density of the material entrained in the gasiform streams issuing from process with which the method of the invention is applicable extends from the size where the particles no longer display gas-like properties, upward. Up to a certain size, particles of solid matter entrained in a gas stream possess gas-like properties in that they do not possess sufficient inertia to have a motion other than that of the surrounding gas stream and will not impinge upon an obstacle in the gas stream because of their inertia effect but if they are in a layer of gas that flows around the obstacle they too will flow around the obstacle. It is the particles above this size which do not possess these gas-like properties that cause the difficulty with regard to plugging of grids and the like and it is to be understood that particles above this size are being referred to when reference is made to gasiform streams having particulate material entrained therein in this application. While size has been referred to, density together with size is a consideration in this regard since a larger but less dense body will be similarly affected by a gasiform stream as a smaller but more dense body.

Thus with the method of the present invention there is no problem with relation to plugging the organization which effects the catalytic oxidation and at the same time more intimate contact between the combustible constituents of the fuel and the oxidation catalyst is provided than is possible with a grid or the like.

It will be thus understood that the above description is intended for the purpose of illustration only and that modifications such as will occur to those skilled in the art are possible and are embraced within the scope and spirit of the invention.

What I claim is:

1. The method of utilizing the B.t.u. content in the regenerator gases coming from a regenerator of a catalytic cracker and having foreign matter entrained therein comprising passing effluent from the regenerator and at substantially the temperature at which it is discharged from the regenerator upwardly through a bed of particulate material that is at least in part an active catalyst such that the activity of the bed is sufficient to oxidize the oxidizable constituents of the effluent with the particles of this material being substantially heavier than that of the foreign matter entrained in said effluent, maintaining the velocity of flow of the effluent passing through said bed of material within the fluidization range of the bed of material but not below the entrainment velocity of the foreign material so that the foreign material passes through said bed, oxidizing the oxidizable constituents of the effluent in said bed and passing the hot gases leaving said bed over steam generation surface imparting heat thereto for the generation of steam.

2. The method of heating and utilizing the B.t.u. content of a gas mixture including a combustible gas and oxygen with the percentage of combustible gas being so low relative to that of oxygen as to be outside the range of flammability and with the gas mixture being at a predetermined high temperature so that upon passing over a catalyst of sufficient activity said combustible gas will be oxidized and with the gas mixture having entrained therein particulate foreign matter of a given size range comprising providing a bed of particulate material that is at least in part an active oxidization catalyst with said bed having an activity sufficient to cause oxidation of the combustible gas in said mixture and with the particle size of said material being in a range substantially greater than the particle size range of the foreign material, passing said gas mixture upwardly through said bed of material, regulating the velocity flow of said gas through said bed to keep it within the fluidization range of said material in said bed while keeping it above the lower limit required for entrainment of said foreign matter in the gas so that it passes through said bed of material, effecting oxidation of the combustible gas in said mixture within said bed and passing the gaseous effluent from said bed over heat exchange surface and imparting heat from said effluent thereto.

3. The method of heating and utilizing the B.t.u. content of a gas mixture including a combustible gas and oxygen with the percentage of combustible gas being so low relative to that of oxygen as to be outside the range of flammability and with the gas mixture being at a predetermined high temperature so that upon passing over a catalyst of sufficient activity said combustible gas will be oxidized and with the gas mixture having entrained therein particulate foreign matter of a given weight range comprising providing a bed of particulate material that is at least in part an active oxidation catalyst with said bed having an activity sufficient to cause oxidation of the combustible gas in said mixture and with the weight of the particles of said material being in a range substantially greater than the range of the foreign material, passing said gas mixture upwardly through said bed of material, regulating the velocity flow of said gas through said bed to keep it within the fluidization range of said material in said bed while keeping it above the lower limit required for entrainment of said foreign matter in the gas so that it passes through said bed of material, effecting oxidation of the combustible gas in said mixture within said bed and passing the gaseous effluent from said bed over heat exchange surface and imparting heat from said effluent thereto.

4. The method of utilizing the B.t.u. content in the regenerator gases coming from a regenerator of a catalytic cracker and having foreign matter entrained therein comprising passing effluent from the regenerator and at substantially the temperature at which it is discharged from the regenerator upwardly through a bed of particulate material that is at least in part an active catalyst such that the activity of the bed is sufficient to oxidize the oxidizable constituents of the effluent with the particles of this material being substantially heavier than that of the foreign matter entrained in said effluent, maintaining the velocity of flow of the effluent passing through said bed of material within the fluidization range of the bed of material but not below the entrainment velocity of the foreign material so that the foreign material passes through said bed, and oxidizing the oxidizable constituents of the effluent in said bed.

5. The method of heating and utilizing the B.t.u. content of a gas mixture including a combustible gas and oxygen with the percentage of combustible gas being so low relative to that of oxygen as to be outside the range of flammability and with the gas mixture being at a predetermined high temperature so that upon passing over a catalyst of sufficient activity said combustible gas will be oxidized and with the gas mixture having entrained therein particulate foreign matter of a given size range comprising providing a bed of particulate material that is at least in part an active oxidation catalyst with said bed having an activity sufficient to cause oxidation of the combustible gas in said mixture and with the particle size of said material being in a range substantially greater than the particle size range of the foreign material, passing said gas mixture upwardly through said bed of material, regulating the velocity flow of said gas through said bed to keep it within the fluidization range of said material in said bed while keeping it above the lower limit required for entrainment of said foreign matter in the gas so that it passes through said bed of material, and effecting oxidation of the combustible gas in said mixture within said bed.

6. The method comprising heating to a predetermined temperature a mass of discrete material that is at least in part an oxidation catalyst and the particles of which are at least a predetermined size, passing upwardly through said mass a gas mixture which contains oxygen and a combustible gas in proportions outside the range of flammability but which will oxidize in the presence of said catalyst at said predetermined temperature and which gas mixture has entrained therein foreign particulate matter of a size less than said predetermined size, regulating the velocity of flow of said gas mixture through said mass to keep it within the fluidization range of said mass while keeping it above the lower limit required for entrainment of said foreign matter in said gas mixture so that it passes through said mass of material, and catalytically oxidizing the combustible gas in said mixture in the presence of said oxidation catalyst during traversal of the mass by said gas mixture.

References Cited in the file of this patent

UNITED STATES PATENTS

| | | |
|---|---|---|
| 2,121,733 | Cottrell | June 21, 1938 |
| 2,393,839 | Thomas et al. | Jan. 29, 1946 |
| 2,487,743 | Trotter | Nov. 8, 1949 |
| 2,638,684 | Jukkola | May 19, 1953 |
| 2,750,258 | Jukkola et al. | June 12, 1956 |
| 2,853,455 | Campbell et al. | Sept. 23, 1958 |